July 4, 1939.　　　E. W. HENRY ET AL　　　2,164,456
MEANS FOR SUPPORTING AND ELEVATING AUTOMOBILES IN FREIGHT CARS
Filed Oct. 6, 1937　　　4 Sheets-Sheet 1
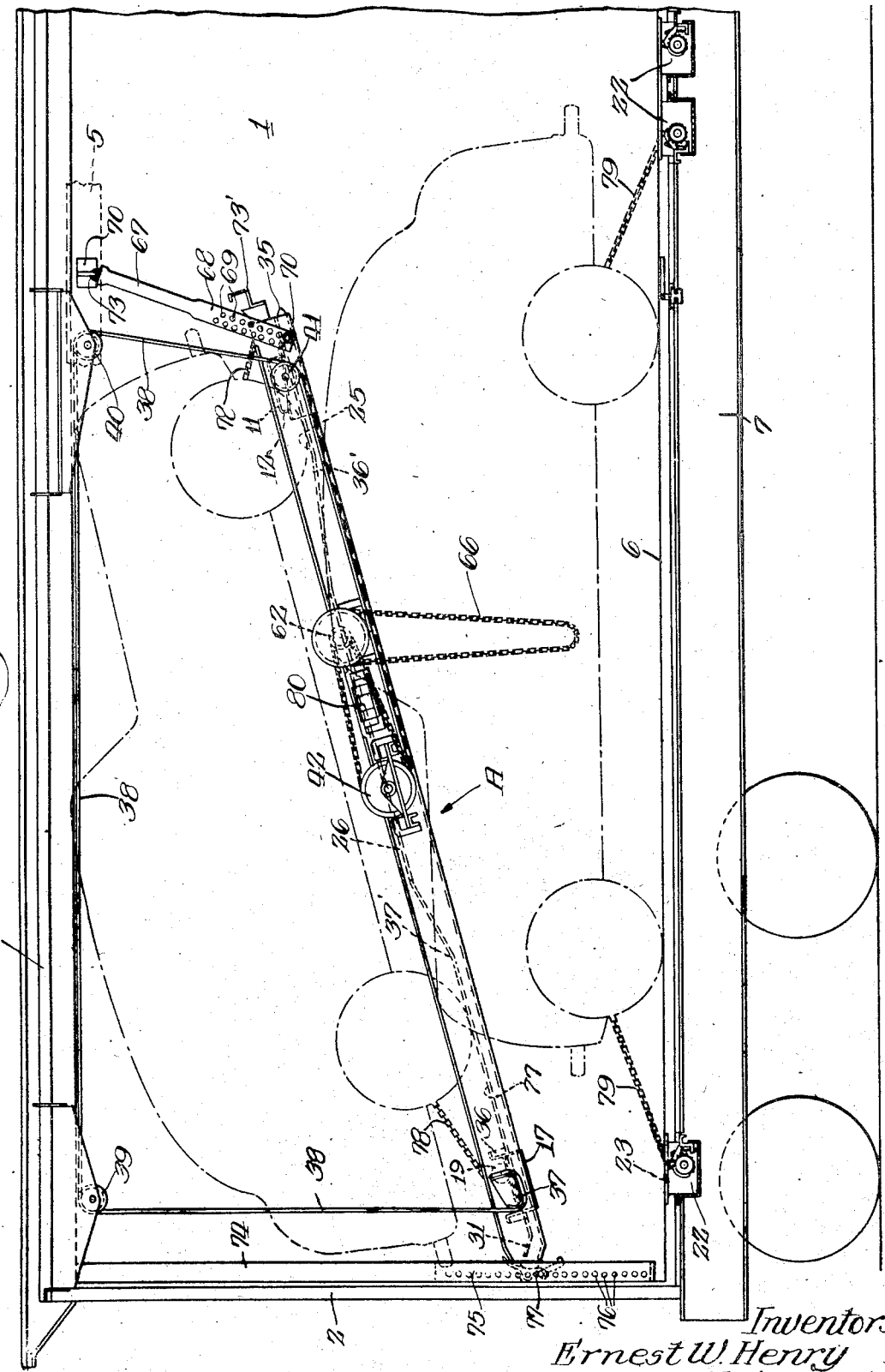
Inventors:
Ernest W. Henry
Thomas H. Everett,
By Charles L. Howard Atty.

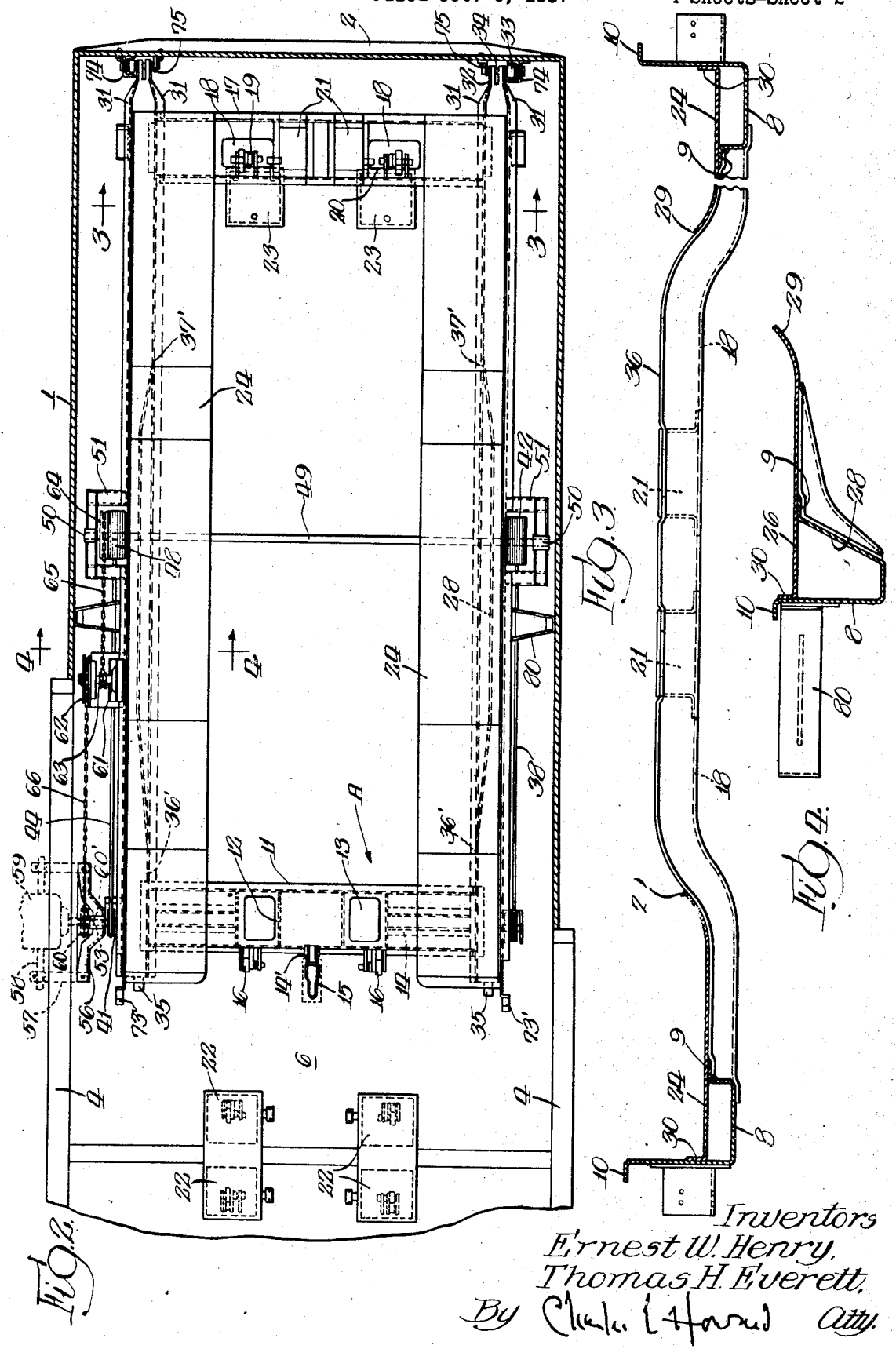

July 4, 1939.  E. W. HENRY ET AL  2,164,456
MEANS FOR SUPPORTING AND ELEVATING AUTOMOBILES IN FREIGHT CARS
Filed Oct. 6, 1937   4 Sheets-Sheet 3
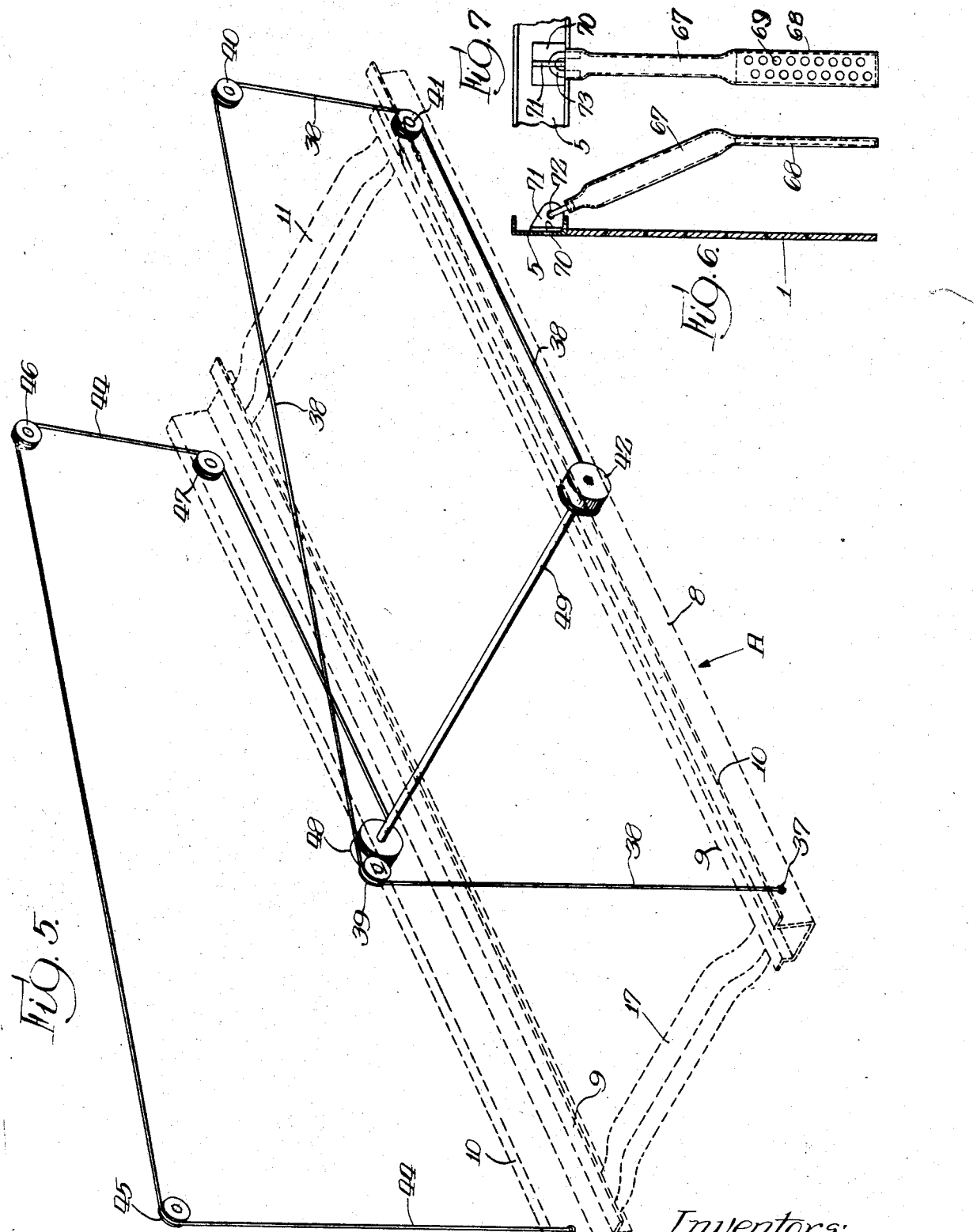
Inventors:
Ernest W. Henry,
Thomas H. Everett,
By Charles L. Howard Atty.

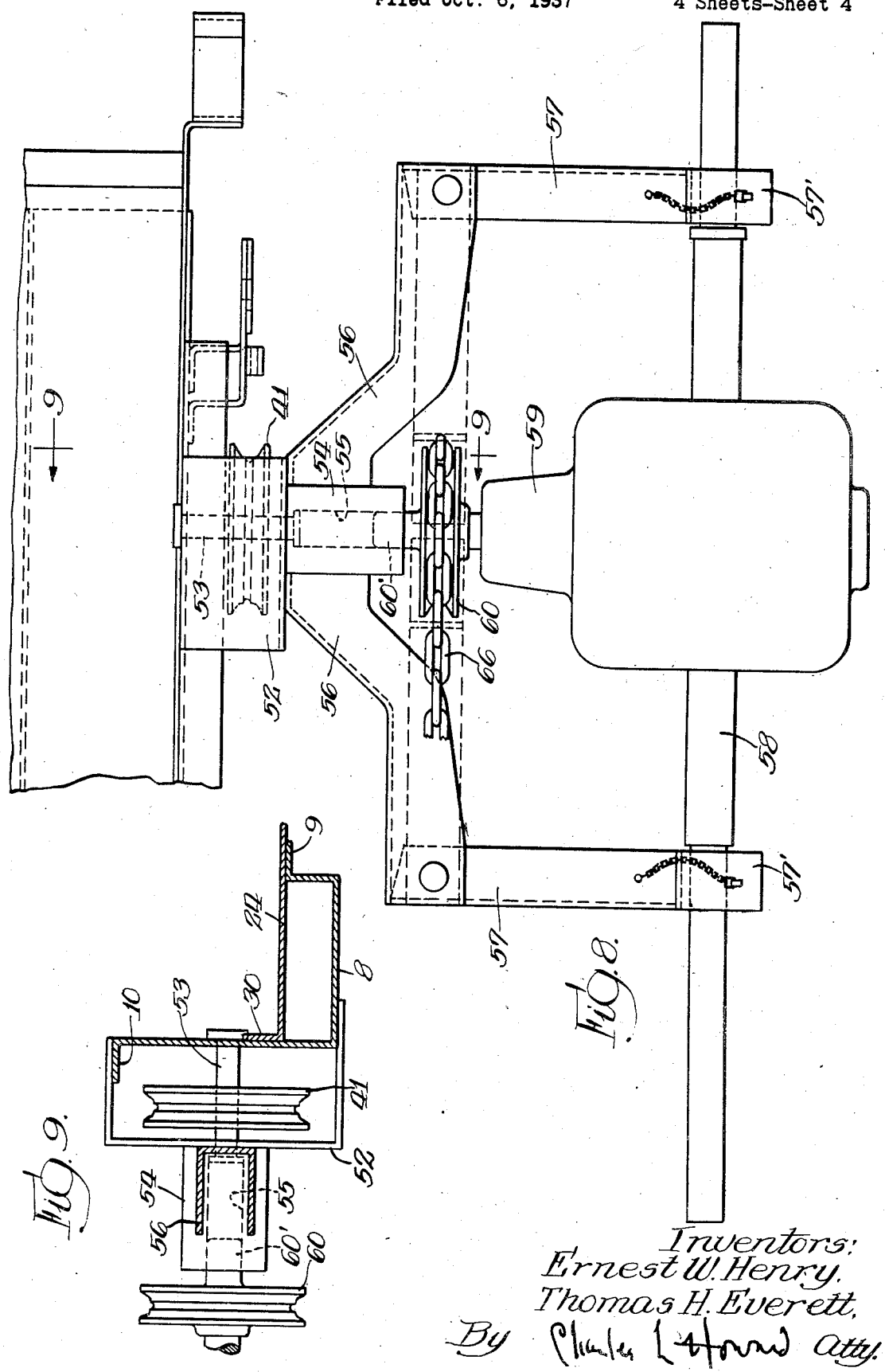

Patented July 4, 1939

2,164,456

UNITED STATES PATENT OFFICE 2,164,456

MEANS FOR SUPPORTING AND ELEVATING AUTOMOBILES IN FREIGHT CARS

Ernest W. Henry, Battle Creek, Mich., and Thomas H. Everett, Canton, Ohio

Application October 6, 1937, Serial No. 167,606

16 Claims. (Cl. 105—368)

This invention relates to means for supporting and elevating automobiles in freight cars. The specific means for carrying out the invention include a novel deck upon which an automobile may be supported and raised in elevated positions, an arrangement of hoisting cables connected to the deck and hoisting mechanism located on the deck itself. The deck shown in the drawings is of the type disclosed in the co-pending patent application of William H. Mussey, Serial No. 211,-994, filed June 6, 1938, although it is understood that our novel means for supporting and elevating automobiles in freight cars can be used with other types of decks. In addition, this invention includes a novel universal jointed suspension arm hung adjacent the roof for supporting the tilted end of the deck in proper position.

Preferably in the use of this invention four automobiles are supported in a car for transportation, two on the floor back to back and two tilted or semi-decked in the car, one at each end.

The object of this invention is to provide a simple, rugged and inexpensive mechanism for loading automobiles in freight cars which permits free entrance through the door of the car, does not endanger the life of the operator while the decks are being tilted or elevated to the roof of the car and prevents damage to automobiles while being loaded.

It will be understood that various changes and modifications may be made in the mechanism as shown in the drawings without departing from the spirit of this invention and that the same are submitted for illustrative purposes only and not in a limiting sense, the scope of the invention being defined in the appended claims.

In the accompanying drawings in which like numerals and letters of reference indicate similar parts throughout the several views:

Figure 1 is a sectional view taken through a car, showing one automobile in semi-decked position with a second car underneath, Figure 2 is a plan view of the deck, Figure 3 is a section on line 3—3 of Figure 2 looking in the direction of the arrows, Figure 4 is a section taken through the line 4—4 of Figure 2 looking in the direction of the arrows, Figure 5 is a diagrammatic view of the hoisting cables and drums, Figure 6 is a side view of the suspension arm, Figure 7 is a front view of the suspension arm, Figure 8 is a plan view of the winding mechanism located on the deck, and Figure 9 is a sectional view of Figure 8.

Referring to the drawings, 1 represents the side of a freight car, 2 the ends of the car, 3 the roof, 4 the staggered door openings, 5 a supporting member adjacent the roof, 6 the car floor and 7 the underframe generally.

As shown in the drawings, A designates the deck as a whole which comprises substantially U-shaped side frame members 8 having inwardly extending flanges 9 and outwardly extending flanges 10. 11 represents a front end member of inverted U-shape having on the bottom thereof a reinforcing plate 12. In the horizontal surface of the member 11 are openings 13 for pockets for the reception of tie-down chains. 14 are reinforcing members for the end member 11. Centrally of the end member and on its front vertical portion is a hook 14' for the reception of a loop 15 pivoted to the floor of the car. This arrangement is shown and described in detail in the pending application of Helmer and Henry, Serial No. 162,802, filed September 7, 1937. On opposite sides of the hook 14' on the end member are tie-down assemblies 16, the purpose of which will be explained later. The rear end member 17 is of U-shape formation and in its horizontal portion are openings 18 for the tie-down assemblies 19 which are suitably attached at 20 to the inner upstanding leg of the U-shaped end member 17. Within the end member 17 are chain pockets 21 for the storage of tie-down chains. 22—22 and 23—23 are pockets for hold-down assemblies to be used in conjunction with floored automobile to be explained more fully later on.

Supported upon each side frame member 8 is a continuous runway 24 for an automobile. The front portions 25 of the runways are supported by the front end of the deck and the central portion 26 of each runway is elevated as shown in Figure 4 and the rear ends 27 of the wheel runways rest upon the rear end members of the deck and are on the same lower level as the front wheel supporting portions of the deck.

To support the elevated portion 26 of each runway in its elevated position the inner portions of each side member with its flange 9 is raised in order that it continues in contact with the elevated central portion of the runways. In other words, the portions of the side members with the flanges 9 are also higher at their central portions to correspond with the increasing height of the central portion of the runways. Also the inner leg of each U-shaped side frame member as it increases in height is also depressed outwardly as at 28 as shown by the cross sectional view, Figure 4. In other words, the inside leg of the U-shaped side members increases in height and the connecting horizontal portion of the U decreases in width from the front end member at a point 36' to the center of the deck and from there to point 37' the inside legs decrease in height and the horizontal portion increases in width. The depressions in the side frame members provide additional clearance for the entrance of the fourth automobile in the car, as to be explained later. It is understood that the flange 9 at the top of the side members is to be used for the purpose of spot welding thereto the runways 24 and that this flange follows the contour of the runways the entire distance. The elevated central portion of the runways is for the purpose of providing clearance for the floor automobile. Also, it will be noted that the runways on their inner edges at 29 are turned upwards to provide means for preventing the automobile tire from running off the runway while the automobile is being decked. The outer edges of the runways are flanged at 30 for the purpose of permitting it to be welded to the side members. Each rear end 31 of a side member of the deck extends beyond the wheel runways and the vertical sides of the U-shaped section are pressed to form a support 32 for end roller 33 which is journaled on pin 34.

Skids 35 are provided on the front end of each side frame member in order to prevent the front part of the deck from catching on the floor of the car as the deck is lowered from the roof. The end cross member 17 is arched centrally as at 36. The front end member 11 may be similarly arched. The front end member 11 and rear end member 17 are flanged for spot welding to the side frame members as shown in the drawings.

The deck is supported and operated by a substantially U-shaped cable suspension arrangement, one continuous cable operating from each side frame member of the deck as follows: Suitably attached at 37 adjacent the rear end of the side frame member of the deck is a cable 38 which runs upwardly and over pulley 39 journaled adjacent the roof and then parallel to the roof and over pulley 40. The cable 38 continues downwardly under pulley 41 journaled adjacent the front end of the side member of the deck and then back along the side member to winding drum 42 located substantially midway of the deck. Opposite attachment 37 of cable 38, is secured at 43 a second cable 44 to the rear end of the other side member of the deck. This cable runs up and over pulley 45 journaled opposite pulley 39, thence parallel to the roof over pulley 46 opposite pulley 40, thence downwardly and under pulley 47 adjacent the end of the other side member of the deck and opposite pulley 41 and then back along the side member to winding drum 48 which is opposite drum 42.

Winding drums 42 and 48 revolve with shaft 49, the shaft extending across the deck midway of its ends and passing through the side members 8 and under the wheel runways 24. Suitable bearings 50 are located at each end of the shaft and are supported by brackets 51 properly secured to the deck side members.

In order to revolve the shaft 49 with its drums 42 and 48 for winding thereon the cables 38 and 44, I provide the following means, operated either by motor or hand: Suitably welded or otherwise attached to the side frame member adjacent its end is an open-ended bracket 52 which also acts as a housing for pulley 41 journaled on pin 53. Extending outwardly from bracket 52 is a motor holding body 54 having a socket 55. Extending from each side of the body 54 is a motor arm-support 56, each support having oppositely disposed hinged arms 57 having separated ends 57' in which are supported motor handles 58 of motor 59. The arms are held in the ends 57' by a pin as shown. When not in use these hinged arms 57 are swung parallel to the side frame members.

The motor 59 may be of any conventional type and carries upon its revolving shaft a chain sheave 60, the shaft having a circular end portion 60' which cooperates with socket 55 in motor holding body 54 for the purpose hereinafter explained. Located on the side frame member longitudinally of the mechanism just described and between the middle of the frame and the front end member 11 is a journal 61 having a bearing support on the side frame member. Adjacent the outer end of this journal is a chain sheave 62 and between this chain sheave and the frame member on the shaft 61 is a second and smaller chain sheave 63 which two chain sheaves act as a gear reducing medium. Adjacent the outer side of drum 48 is a chain sheave 64 rotatable with drums 42 and 48. An endless chain 65 runs around small chain sheave 63 and larger chain sheave 64 and an endless chain 66 runs over chain sheave 62 and motor chain sheave 60 when the motor is to be used for operating the winding drums 42 and 48. When the motor is not to be used but hand means only employed to operate the winding drums the chain 66 hangs from the chain sheave 62 in a convenient position for the operator.

In order to support the front end of the deck in its tilted position, adjacent the roof, two suspension arms 67 are employed, one for each side of the deck. Each arm has a lower off-set portion 68 having therein two rows of staggered holes 69. Each arm is suspended from the car side near the roof from any suitable member, such as 5. The member 5 is provided with a bracket 70 having an outstanding flange 71 provided with an opening 72. Secured to the top of the suspension arm is a loop 73 which when cooperating with the opening 72 provides universal movement for the arm 67.

In the use of the deck it is necessary to raise, guide and hold the rear end of the deck in certain elevated positions. To provide for this the following means are employed: As already stated, each rear end 31 of a side frame member of the deck is provided with pressed-in portion 32 for the purpose of supporting a roller 33. Each roller travels in a track-way comprising a Z-bar 74 and the opposite side of the pressed-in portion 32 is guided by an angle 75. The Z-bar and angle are suitably supported by the end of the car, the Z-bar running from adjacent the car floor to the roof and the angle from adjacent the car floor to a point approximately half the distance between the floor and the roof.

Each angle 75 is provided with openings 76 for the reception of a pin 77 and each Z bar is also provided with openings corresponding to those in the angle. The angle 75 and Z-bar 74 thus provide a track-way for the ends of the side frame members and rollers 33. This construction is shown and described in detail in the above mentioned Helmer and Henry pending application.

The operation of the entire device is as follows: Assuming that four automobiles are to be loaded in the car and both decks are suitably supported adjacent the roof, the first automobile is driven into the car. The indexing pins 77 are placed at the proper height in the indexing Z-bar 74 and the angle 75 for the deck at the opposite end of the car. The deck at this end is then lowered until the rollers 33 rest upon the pins 77 and the front end of the deck rests upon the floor. The automobile is then backed onto the deck and secured thereto by two rear flexible tie-downs 78 running from tie-down assemblies 16. The front end of the deck is then raised placing the deck in a horizontal position with respect to the car floor. The rear end of the automobile is then lashed to the deck through the medium of tie-downs running from the tie-down assemblies 19.

To raise the front end of the deck by motor 59 the circular end portion 60' of the motor shaft is inserted in socket 55 in the motor holding body 54, the handles 58 of the motor resting upon the hinged supporting arms 57. Through the connection of the chain sheave 60 of the motor and the chain sheave 62 by endless chain 66, and through the connection of chain sheave 63 with sheave 64 by endless chain 65, the drums 42 and 48 are revolved upon the operation of motor 59. The rear end of the deck having been indexed it follows that by winding the flexible members 38 and 44 upon the drums 42 and 48 respectively, the front end of the loaded deck will be raised adjacent the roof of the car. After the front end of the deck is thus raised it is held in position by suspension arms 67. To assist in guilding the deck when being raised sway bars 80 are provided on the side of each deck midway its ends.

When the car is to be used for other purposes than shipping automobiles the decks are raised to the roof of the car, the ends of the suspension arms being placed on brackets 73' and due to the flexibility of the suspension arms the free ends of the arms swing toward the center of the car when the deck is being raised.

If it is found necessary to load an automobile on the deck while the deck is resting on the floor, the loop 15 is thrown over the finger 14' on the fron end member of the deck, thus holding the front of the deck to the floor. The rear end of the deck with the automobile lashed thereon is then raised to its proper indexing point and held in that position by pin 77. Thereafter the front end of the deck is elevated as heretofore described and held by suspension arm 67.

The second automobile is then driven into the car under the tilted deck. Indexing pins for the deck for the second automobile are set at the proper height and the deck lowered until the rear end is properly indexed and the front end rests on the floor. The second automobile is then backed onto this desk and lashed down with four flexible tie-downs similar to those indicated by 78. The loaded deck is then raised to its tilted shipping position as just described and suspension arms 68 fastened to the deck to support its front end.

The third and fourth operations consist of running two automobiles—the third and fourth—on the floor of the car, one under each of the tilted automobiles, the front end of the automobiles facing the ends of the freight car. The automobiles resting on the floor of the freight car are lashed by tie-downs 79, running from tie-down assemblies 22, similar to tie-downs 78.

From the above it will be seen that each deck carries its own motor driven mechanism cooperating with the cables to raise and lower the deck. Having this mechanism on the deck permits the deck and mechanism to be assembled as a whole and to be easily installed in a car with a minimum amount of alteration to the car. Also at times when it is found necessary to operate the deck by hand the conversion from motor drive may be quickly accomplished. And by holding or indexing the front or rear end of the deck, the unattached end of the deck may be raised or lowered speedily and efficiently by the particular arrangement of cables shown and described. Moreover, due to the rear indexing of the deck and its support at its forward end by the suspension arm the deck cannot move longitudinally in the car and due to the front and rear tie-down arrangement the automobile cannot move longitudinally with respect to the deck. The omission of this longitudinal movement is a great advantage in preventing damage to the automobile in the car under shock. Also, the tops of the automobiles under the tilted decks do not extend above the decks but owning to the curvature of the inside legs of the side frame members and the arching of the front end members ample clearance is provided for the top of the automobile under each deck.

What we desire to secure and protect by Letters Patent of the United States is,

1. Means for supporting and elevating an automobile in a freight car comprising a deck upon which the automobile is held in position, flexible members attached to said deck and cooperating with pulleys in the upper part of the car and on the deck, winding mechanism upon said deck including drums connected to said flexible members and means for operating said winding mechanism.

2. Means for supporting and elevating an automobile in a freight car comprising a deck upon which the automobile is held in position, flexible members attached to said deck and cooperating with pulleys in the upper part of the car and on the deck, a shaft journaled on the deck transversely and substantially midway thereof, drums fixed upon opposite ends of said shaft and connected to said flexible members, winding mechanism upon said deck cooperating with said shaft and drums, and means for operating said winding mechanism whereby said flexible members are wound upon said drums.

3. Means for supporting and elevating an automobile in a freight car comprising a deck upon which the automobile is held in position, flexible members attached to said deck and cooperating with pulleys in the upper part of the car and on the deck, a shaft journaled on the deck transversely and substantially midway thereof, drums fixed upon opposite ends of said shaft and connected to said flexible members, mechanism on said deck for rotating said drums including endless chains and chain sheaves and a motor supported by the deck for driving said mechanism.

4. Means for supporting and elevating an automobile in a freight car comprising a deck upon which the automobile is held in position, flexible members attached to said deck and cooperating with pulleys in the upper part of the car and on the deck, a shaft journaled on the deck transversely and substantially midway thereof, drums fixed upon opposite ends of said shaft and connected to said flexible members, mechanism on said deck for rotating said drums including a chain sheave fixed to said shaft adjacent one of the drums, a reducing gear journaled to said deck in line with said chain sheave, an endless chain connecting said chain sheave and gear reducer, a second chain sheave journaled adjacent the reducing gear, a motor supported by said deck having thereon a chain sheave, an endless chain connecting said last two mentioned chain sheaves and means whereby upon operation of the motor said mechanism revolves said drums and winds said flexible members thereon.

5. Means for supporting and elevating an automobile in a freight car comprising a deck upon which the automobile is held in position, flexible members attached to said deck and cooperating with pulleys in the upper part of the car and on the deck, a shaft journaled on the deck transversely and substantially midway thereof, drums fixed upon the opposite ends of the shaft and connected to said flexible members, mechanism on said deck for rotating said drums including chain sheaves, one of which is fixed to said shaft adjacent one of the drums and the other chain sheave journaled on the deck longitudinally of said first mentioned sheave, an endless chain connecting said two chain sheaves and a second endless chain running over said last mentioned chain sheave the operation of which by hand revolves said two chain sheaves and drums and winds thereon the flexible members.

6. Means for supporting and elevating an automobile in a freight car comprising a deck upon which an automobile is held in position, a shaft journaled on the deck transversely and substantially midway thereof, drums upon opposite ends of said shaft, a cable connected to an end corner of the deck and travelling over pulleys journaled adjacent the roof of the car and along one side thereof and thence downwardly under a pulley on the deck journaled longitudinally of the point of connection of the cable to the deck and thence to one of said drums, a second cable connected to the opposite end corner of the deck and travelling over pulleys journaled adjacent the roof of the car and along the opposite side thereof and thence downwardly under a pulley on the deck journaled longitudinally of the point of connection of the second cable and thence to the opposite drum, winding mechanism upon said deck for rotating said shaft and drums and means for operating said winding mechanism whereby said cables are wound upon said drums.

7. Means for supporting and elevating an automobile in a freight car comprising a deck upon which the automobile is held in position, flexible members attached to said deck and cooperating with pulleys in the upper part of the car and on the deck, winding mechanism upon said deck connected to said flexible members and means for operating said winding mechanism.

8. A deck for supporting a wheeled vehicle in a freight car said deck having winding mechanism thereon for elevating said deck including flexible members cooperating with members adjacent the car roof said flexible members being attached to the deck and to the winding mechanism, and operating means for said winding mechanism carried on the deck.

9. Apparatus for supporting a wheeled vehicle in an elevated position in a freight car comprising a deck having parallel wheel supporting longitudinally disposed runways, the central portion of said runways being elevated with relation to the ends, said deck having flexible members attached thereto, cooperating with pulleys in the upper part of the car, winding mechanism carried by said deck said flexible members attached to said winding mechanism and means for operating said winding mechanism.

10. Apparatus for supporting a wheeled vehicle in an elevated position in a freight car, comprising a deck having longitudinally disposed wheel supporting runways, means carried by said deck for anchoring a wheeled vehicle thereto, winding mechanism carried by said deck including flexible members cooperating with pulleys in the upper part of the car said flexible members being attached to the deck and to the winding mechanism, and means for operating said winding mechanism.

11. Means for supporting and elevating a vehicle in a freight car comprising a deck having parallel longitudinally disposed runways, means carried by said deck for anchoring the vehicle to same, means for anchoring one end of said deck adjacent the end of the car, elevating mechanism carried by said deck including a shaft journaled on the deck, drums fixed upon opposite ends of said shaft, flexible members attached to said deck and to said drums, said flexible members cooperating with pulleys in the upper part of the car and on the deck, winding mechanism upon the deck cooperating with said shaft and drums, and means for operating said winding mechanism whereby said deck can be raised and lowered by the winding or unwinding of said flexible members on or off said drums.

12. Apparatus for supporting and elevating a vehicle in a freight car comprising a deck having winding mechanism mounted thereon and flexible members attached to said deck and said winding mechanism, and pulleys cooperating with said flexible members located adjacent the roof of the car.

13. Means for supporting and elevating an automobile in a freight car including a deck upon which the automobile is supported, a pair of flexible members each of which has one end attached to said deck, intermediate portions of each flexible member cooperating with pulleys in the upper part of the car and with a pulley on the deck, the opposite end of each flexible member being associated with winding mechanism mounted on the deck.

14. Means for supporting and elevating an automobile in a freight car including a deck upon which the automobile is supported, a pair of flexible members attached at one end to said deck, each of said flexible members extending upwardly from its point of attachment to the deck and cooperating with pulleys in the upper part of the car, each flexible member extending from said pulleys to the deck and cooperating with a pulley on the deck, and winding mechanism carried by the deck with which the opposite end of each flexible member is associated.

15. Means for supporting and elevating an automobile in a freight car including a deck, a pair of flexible members each of which is attached at one of its ends to said deck, each of said flexible members cooperating with pulleys adjacent the car roof and a pulley on the deck, the opposite end of each flexible member being secured to a winding drum mounted on said deck whereby the flexible members can be wound on said drums to elevate the deck.

16. The combination defined by claim 15 including operating mechanism for the winding drum carried by the deck.

ERNEST W. HENRY.
THOMAS H. EVERETT.